United States Patent [19]
Yokoi et al.

[11] Patent Number: 4,742,287
[45] Date of Patent: May 3, 1988

[54] MOTOR DRIVING DEVICE FOR PRINTER

[75] Inventors: Takeshi Yokoi, Kagamigahara; Shuhei Okamori, Nagoya, both of Japan

[73] Assignee: Brother Kogyo Kabushiki Kaisha, Nagoya, Japan

[21] Appl. No.: 947,191

[22] Filed: Dec. 29, 1986

[30] Foreign Application Priority Data

Dec. 27, 1985 [JP] Japan .................. 60-298900

[51] Int. Cl.[4] ............................. G05B 8/00
[52] U.S. Cl. .................... 318/696; 318/685; 400/605
[58] Field of Search .............. 318/696, 685; 400/605

[56] References Cited

U.S. PATENT DOCUMENTS 4,055,786 10/1977 DiMarzio ................ 318/562
4,401,931 8/1983 Kulterman et al. .......... 318/696
4,663,722 5/1987 Sato .................. 400/605 X

FOREIGN PATENT DOCUMENTS 0053684 6/1982 European Pat. Off. .

Primary Examiner—William M. Shoop, Jr.
Assistant Examiner—Saul M. Bergmann
Attorney, Agent, or Firm—Jordan B. Bierman

[57] ABSTRACT

A motor driving device in a printer wherein a selection signal for carrying out the driving selection of the respective stepping motors in outputted from a control circuit to the stepping motor for an automatic paper feeding mechanism of forms which comprises one of two driven sections and an other stepping motor for a form feeding mechanism which comprises the other driving section in a printer to select one of these motors through drive selection elements corresponding to respective stepping motors, and in which a phase control signal is successively sent to phase current flowing elements provided commonly in the same phase coils or both stepping motors, respectively, and the switching operation of the phase coils of the selected stepping motor is carried out to rotate and drive said motor, and the rotation position of said motor is always recognized by memorizing the corresponding data of each output of said phase control signal, and after the other motor has been selectively driven, in selecting said one stepping motor again, the memorized data are read out to output a phase control signal corresponding to the rotation position of said motor.

2 Claims, 4 Drawing Sheets

FIG. I

MOTOR DRIVING DEVICE FOR PRINTER

BACKGROUND OF THE INVENTION

The present invention relates to a motor driving device for driving a plurality of driven sections which are driven with different operation timing sequences in a printer, and which are, for example, an automatic paper feeding mechanism and a form feeding mechanism or the like to carry out the line feed of cut forms being fed toward a printer body by means of the automatic paper feeding mechanism in the printing position.

Conventionally, as a driving motor for an automatic paper feeding mechanism of cut forms such as letter-size or legal-size paper sheets in a printer, and as a motor to drive a form feed mechanism for carrying out the line feed of the cut forms in the printing position, namely a platen mechanism, a polyphase stepping motor has been separately adopted, respectively. Transistors, as a phase current flowing element, for example, are connected to driving circuits to control two kinds of said stepping motors, each respective phase coil of the respective stepping motors, and the switching of the respective transistors is carried out in accordance with the drive timing of the automatic paper feeding mechanism or the form feeding mechanism, for example, corresponding to a control signal which is outputted from a microcomputer and the like, and these stepping motors have been driven by causing an excitation current to flow in the phase coils to which the transistors are connected. Accordingly, since the transistors are connected to the respective coils of the stepping motors one to one to cause the excitation current to successively flow in the respective phase coils, the same number of transistors are required as the total phase number of the respective stepping motors.

As mentioned above, since the phase current flowing elements such as transistor to cause the excitation current to flow in the respective phase coils are required in the same number as the total phase number of the respective stepping motors in the stepping motor driving circuit in a conventional printer, there are problems, such as high cost, and the space occupied by the current flowing elements on the printed circuit board of the printer is large, and it is difficult to reduce the size of the printed circuit board and therefore there is a limit to the printer compactness.

SUMMARY OF THE INVENTION

An object of the present invention is to provide a motor driving device for a printer which allows the number of phase current flowing elements for the stepping motors to be reduced and which lowers the cost of printer manufacturing and allows the compact design of the motor driving device to drive a plurality of driven sections which are operated with different operation timing sequences, respectively.

In order to achieve the above stated objectives, the present invention will take the following configuration, wherein a selection signal to carry out the driving selection of respective stepping motors is outputted from a control circuit to one stepping motor for an automatic paper feeding mechanism for cut forms which is, for example, one driven section and to the other stepping motor for a form feeding mechanism which is the other driven section and is driven with a different timing from said driven section, and the rotation position of respective stepping motors can be identified by memorizing the data corresponding to a phase control signal in a memory device for each phase control signal output, and phase current flowing elements are commonly connected to the same phase of each respective stepping motor.

Namely, in the above-mentioned configuration, when the cut forms are fed into the printer body by means of the automatic paper feeding mechanism, which is one driven section, said control circuit outputs the selection signal to the drive selection elements corresponding to said single stepping motor to cause the motor to selectively drive, and outputs the phase control signal to the phase current flowing elements to cause said stepping motor to drive. At this time, said memory device memorizes the data corresponding to the outputted phase control signal, and in outputting the phase control signal at the next time to the motor, said memorized data are read out from the memory device to recognize the rotation position of the motor and thereafter the phase control signal is outputted. After the cut forms are fed in a given position by the drive of said stepping motor, said control circuit, in turn outputs the selection signal to the other drive selection elements, and selects the other said stepping motor as a stepping motor to be driven, and further outputs the phase control signal to the phase current flowing elements, whereby the form feeding mechanism as the other driven section is operated, and the other said stepping motor is rotated to cause the line feed of the cut form to be carried out in the printing position. At this time, said memory device, which is similar to the above, memorizes the data corresponding to the outputted phase control signal, and when the control circuit outputs the phase control signal the next time to the other stepping motor, the data are read out from the memory device to recognize the rotation position of the motor and thereafter the phase control signal is outputted.

As mentioned above, by use of the memory device, the final phase exciting output data are memorized with reference to the respective stepping motors, and, therefore, it is possible to restart the respective stepping motors the next time without generating a deviation of position, and since only one of the two stepping motors is selectively driven, even if the phase current flowing elements, such as a transistor for exciting the respective phase coils, are commonly connected for each phase coil of each stepping motor. It is possible to carry out the drive and control as though these phase current flowing elements are connected to each respective phase coil of each respective stepping motors.

Accordingly, since it is possible to radically reduce the number of phase current flowing elements, in comparison with a conventional system, there are advantages, such as the reduction in the size of the printer and a reduction in the cost of production.

Various other objectives and advantages, and features of the invention will become apparent to those skilled in the art from the following discussion, taken in conjunction with the accompanying drawings.

DETAILED DESCRIPTION OF THE PREFERRED EMBODIMENT

First, with reference to FIGS. 1 to 3, the outline of a printer provided with a motor driving device in accordance with the present invention will be described hereinafter. In relation to the front and the rear of the printer, the side near an operator is assumed as the front portion and the side farthest from the operator is assumed as the rear portion.

Figure 1:
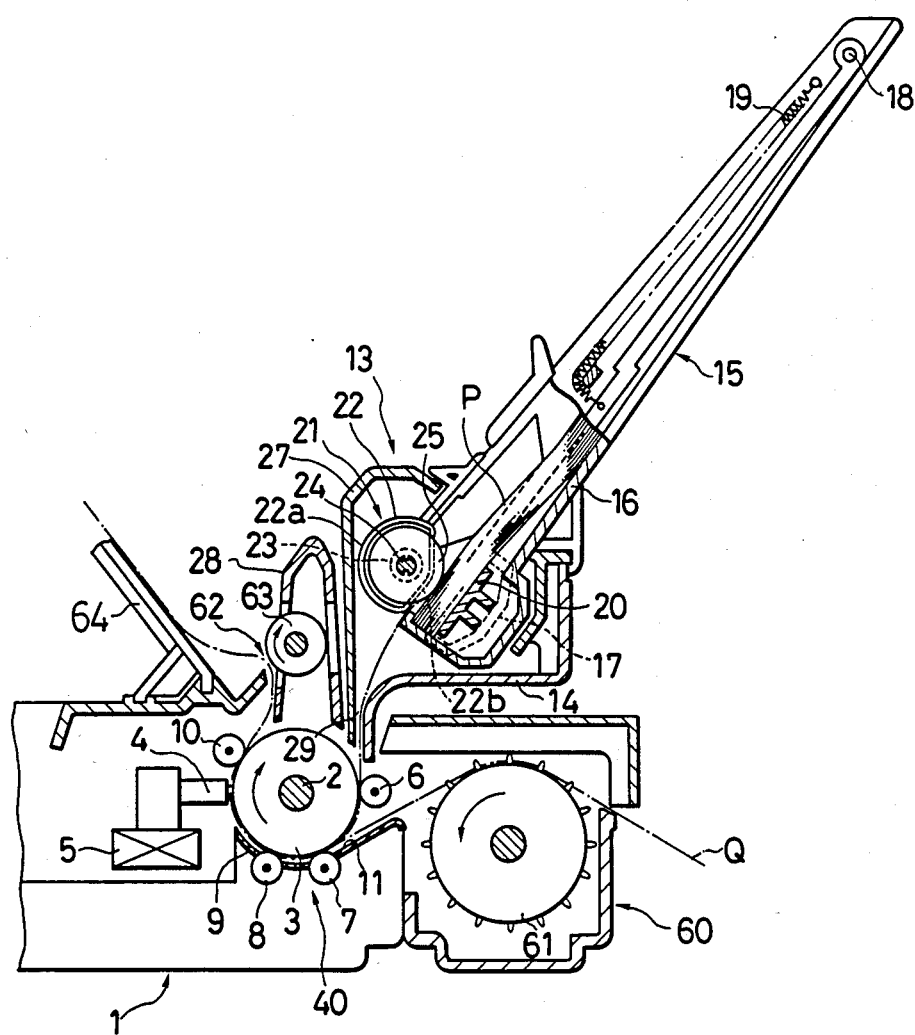
FIG. 1 is a rear vertical sectional view of an embodiment of a printer provided with a motor driving device in accordance with the present invention.

In FIG. 1, the rear portion of printer body 1 is shown, wherein a rotatable platen shaft 2 is provided. A platen 3 which integrally rotates together with the shaft 2 is mounted on the platen shaft 2. As shown in FIG. 2, a stepping motor STM 1 is used as a driving source of a form feed mechanism 40 for rotating the platen shaft 2. And in the front of the platen 3, a carriage 5 provided with a printing head 4 is provided so as to be capable of reciprocating along the print lines of the platen 3. A printing position is defined between the printing head 4 and the platen 3.

Three feed rollers 6, 7 and 8 which press on the outer peripheral surface of the platen 3 are provided in the rear portion and the lower portion of the platen 3, and are adapted to carry out the paper feed operation in association with the rotation of the platen 3. These feed rollers 6, 7 and 8 operate in conjunction with the platen 3 to constitute the form feed mechanism 40.

Further, a guide plate 9, to define a paper guide passage 11 along the outer peripheral surface of the lower portion of the platen 3, is provided.

Furthermore, a paper bail 10 which is attachable and detachable and is opposite from the outer peripheral surface of the platen 3 is provided in the upper portion of the front of platen 3.

On the upper portion of the rear of printer body 1, an automatic paper feeding mechanism 13 for feeding cut forms P to the platen 3, which is a unit, is detachably mounted. A paper holder 15 for stacking a large number of cut forms P and holding them is provided in a supporting frame 14 of the paper feeding mechanism 13. The paper holder 15 has a plurality of paper receiving plates 16 which is supported on the supporting frame 14, and is adjustable to accommodate different sized cut forms.

In the side portion of the paper receiving plates 16 of the paper holder 15, a pair of pivoting supporting arms 17 are provided, using a pin 18 as a fulcrum in the upper end thereof. A pressing body 20, is provided in the lower portion between these supporting arms. The pressing body 20 presses the cut forms P so as to cause them to contact the feeding surface 22a of a feeding cam roller 21 (described later) by the action in which the pressing body 20 is capable of advancing and retracting against the paper receiving surface of each paper receiving plate 16 in the paper holder 15 and is normally projected from the paper receiving surface by means of a spring 19.

In the paper feeding side of the paper holder 15 of the automatic paper feeding mechanism 13, a rotatable driving shaft 24 is provided. The driving shaft 24 is rotated through a gear train or the like which rotates, using a reversibly rotatable stepping motor STM 2 as a driving source as shown in FIG. 3. On the driving shaft 24, a pair of right and left feeding cam rollers 21, for feeding the cut forms P of the paper holder 15 toward the platen 3 one sheet at a time, are fitted at the boss portion thereof, in which the feeding cam rollers can be integrally rotated together with the driving shaft 27 and can be slid to an axial direction of the driving shaft 24.

The outer periphery of each of these rollers 21 is formed by a rubber layer 22 made of high friction material, and the rollers are formed to an approximately semilunar shape by the arcuate feeding surface 22a which contacts the cut form P of the most upper layer in the paper holder 15 to feed the paper, and non-feeding surface 22b which makes the chord of an arc of the feeding surface 22a. The circumferential length of the feeding surface 22a is formed to have the same distance as the distance from the front end of the paper holder 15 to a contact point between the platen 3 and the feed roller 6 contacting the outer peripheral surface of the rear portion of the platen, or to have a distance larger than that distance. And during one rotation of the driving shaft 24, the cut form P of the most upper layer is adapted to be fed as shown downwardly by a chain line between the platen 3 and the feed roller 6 contacting the outer peripheral surface of the rear portion in the platen by means of the feeding surface 22a of each feeding cam roller 21.

Around the shaft of the driving shaft 24, a pair of right and left paper pressing members 25 made of low friction material are provided, which contact the cut forms P and separate the cut forms from the non-feeding surface 22b of the feeding rollers 21 and support them when the non-feeding surface 22b of the feeding rollers 21 are in the non-feeding position opposite to the cut forms P of the paper holder 15.

Further, in the front portion between the right and left side frames, a feeding cam roller cover 27 and an ejecting roller cover 28 are provided in the front and the rear. Furthermore, between the front wall of the supporting frame 14 and the feeding roller cover 27, a feeding guide passage 29 for feeding and guiding the cut forms P of the paper holder 15 toward the platen 3 is defined, as shown by broken line.

In this configured embodiment, as mentioned above, when the cut forms P laminated in the paper holder 15 are fed toward the platen 3, as shown in FIG. 1, the feeding cam rollers 21 are rotated by one rotation together with the driving shaft 24 from the position where the non-feeding surface 22b of each feeding cam roller 21 is opposite to the cut forms P, and while these feeding cam rollers 21 rotate by one rotation, the cut form P in the most upper layer in the paper holder 15 is fed to the paper feeding slit between the platen 3 and the feed roller 6 through the feeding guide passage 29 by the frictional contact of the cut form P with the feeding surface 22a.

In feeding the cut forms P by the feeding surface 22a of each feeding cam roller 21, the pressing body 20 contacts the back of the forms P by means of the biasing force of spring 19 so as to continually press and hold the cut form P of the most upper layer against the feeding surface 22a.

After the cut forms P are fed to a given position by means of the feeding surface 22a of each feeding roller 21, each feeding roller 21 successively rotates by one rotation so as to cause the non-feeding surface 22b to come to the original position opposite to the cut forms P, and is stopped at this original position, whereby, the automatic paper feeding operation for the forms P is completed.

Following the completion of the automatic paper feeding operation, the form feeding operation is started, and the platen 3 is rotated, and the cut forms P are fed to the printing position. In feeding the cut forms P by the rotation of the platen 3, since the rear portion of the cut form P contacts the paper pressing member 25 made of low friction material and is supported thereon, without contacting the rubber layer 22 in the outer periphery of the feeding rollers 21 made of high friction material, the cut form P is smoothly fed to the printing position by means of the form feeding mechanism 40. And at this printing position, the line feed is made on the basis of the operation of the mechanism 40.

4-phase stepping motors, for example, are used in the stepping motor STM 1 for rotating the platen 3 and the stepping motor STM 2 for rotating the driving shaft 24 of the paper feeding mechanism 13, respectively.

Figure 2:
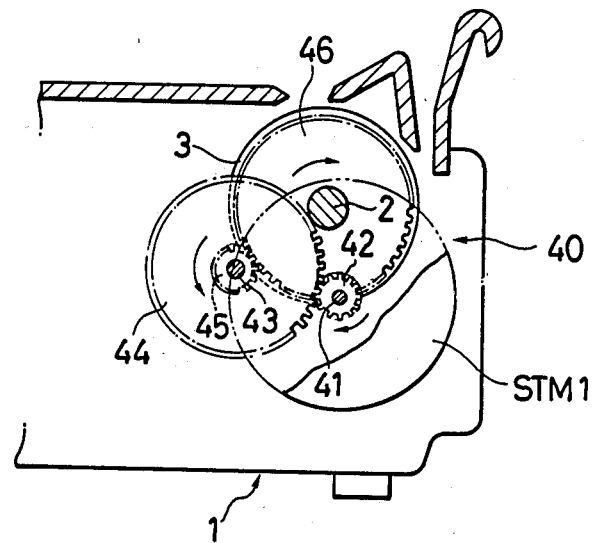
FIG. 2 is an explanatory view of the essential part of a form feed mechanism.

The stepping motor STM 1 of the form feeding mechanism 40, shown in FIG. 2, is supported on the printer body 1, and is coupled for driving by means of a small gear 42 secured to a motor shaft 41, an intermediate gear 44 with a large diameter which meshes with the small gear and rotates on the shaft 43 supported on the printer body 1, an intermediate gear 45 with a small diameter which integrally rotates together with the gear 44 and a platen driving gear 46 which meshes with the gear 45 and integrally rotates together with the platen 3 on the platen shaft 2. Accordingly, in FIG. 2, when the motor STM 1 rotates in a clockwise direction shown by the arrow, in response thereto, the above-mentioned gears rotate in the direction indicated by the arrow, and the platen 3 rotates in a line feed direction along a clockwise direction. Further, if the motor STM 1 reversely rotates, in response thereto, the platen 3 reversely rotates to reverse the form feeding direction.

Figure 3:
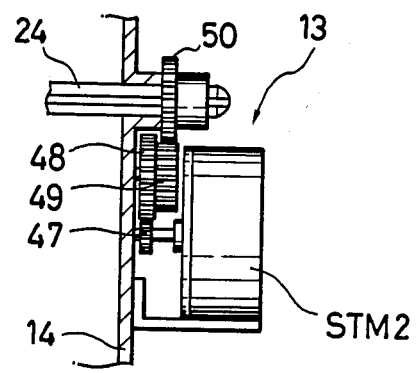
FIG. 3 is an explanatory view of the essential part of an automatic paper feeding mechanism for cut forms.

The stepping motor STM 2 of the automatic paper feeding mechanism 13, shown in FIG. 3, is supported on the supporting frame 14, and is coupled to a driving gear 50 secured to the driving gear 24 through the intermediate gears 47, 48 and 49 which are meshed in order.

Accordingly, with the rotation of the motor STM 2, the driving shaft 24 is rotated and driven, and the feeding cam rollers 21 attached to the shaft 24 are similarly rotated and driven, and thus the automatic paper feeding operation is carried out.

In this printer, the above-mentioned stepping motor STM 2 is first driven for a given period of time, and during this period, the automatic paper feeding mechanism 13 is operated, and after the completion of the operation of the mechanism 13, the other stepping motor STM 1 is driven for a given period of time, and during this period, the form feeding mechanism 40 is operated. Namely, both mechanisms 13 and 40 are constituted to operate with different operation timings which are not mutually superimposed.

Further, in FIG. 1, reference numeral 60 denotes a paper feeding mechanism for continuous forms, which is attached to the rear end portion of the printer body 1, and which has a sprocket wheel 61, and when the wheel 61 is rotated in the direction indicated by the arrow, the continuous forms Q which are suspended in the wheel 61 are fed into the form feeding mechanism 40 of the printer body 1 and pass through the printing position, and are positively fed out to the upper portion at a paper exiting slit 62 by means of a paper exiting roller 63. On the other hand, the cut forms P are fed out to the upper portion from the paper exiting slit 62 and thereafter they are accumulated in a stacker 64 in stacked state, again.

Figure 4:
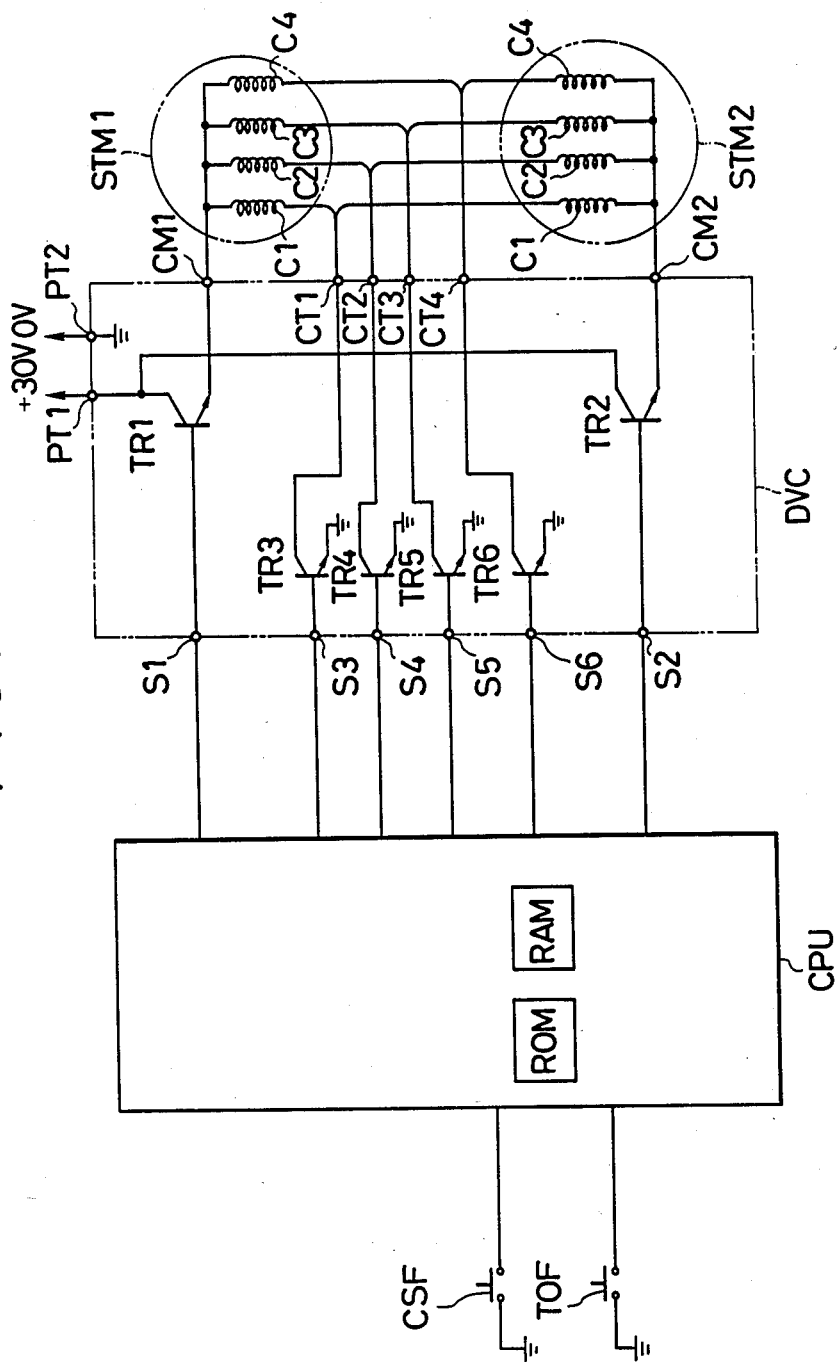
FIG. 4 is a circuit diagram of the control device for driving and controlling two stepping motors.

As shown in FIG. 4, the first phase coil C1, the second phase coil C2, the third phase coil C3 and the fourth phase coil C4 are, respectively, formed in respective stepping motors STM 1 and STM 2. Each respective lead of respective phase coils C1–C4 in the stepping motor STM 1 are connected to a common terminal CM 1 provided in a driving circuit DVC which will be described later, and each respective lead of respective phase coils C1–C4 in the stepping motor STM 2 are connected to a common terminal CM 2.

On the other hand, the other lead of the first phase coil C1 in the stepping motor STM 1 an the other lead of the first phase coil C1 in the stepping motor STM 2 are connected to an external terminal CT 1, and similarly, the other leads of the second phase coil C 2 in respective motors are connected to an external terminal CT2, and the other leads of the third phase coil C3 in respective motors are connected to an external terminal CT 3, and further the other leads of the fourth phase coil C4 in respective motors are connected to an external terminal CT 4.

Within the driving circuit DVC provided with respective terminals CM 1, CM 2, CT 1, CT 2, CT 3 and CT 4 mentioned above, a transistor TR 1 as the first drive selection element in which the emitter is connected to the terminal CM 1, a transistor TR 2 as the second drive selection element in which the emitter is connected to the terminal CM 2, a transistor TR 3 in which the collector is connected to the terminal CT 1, a transistor TR 4 in which the collector is connected the terminal CT 2, a transistor TR 5 in which the collector is connected to the terminal CT 3 and a transistor TR 6 in which the collector is connected to the terminal CT 4 are accommodated, and the transistors TR 3–TR 6 constitute the phase current flowing elements to carry out the switching operation for exciting the respective phases in both motors.

The collector of the transistor TR 1 and the collector of the transistor TR 2 are connected to a terminal PT 1, and the respective emitters of the transistor TR 3, TR 4, TR 5 and TR 6 are connected to a terminal PT 2. The driving power supply for the stepping motors STM 1 and STM 2, for example a D.C 30 V power supply, is externally supplied to the terminals PT 1 and PT 2.

On the other hand, the base of the transistor TR 1 is connected to a terminal S 1, and the base of the transistor TR 2 is connected to a terminal S 2, and the base of the transistor TR 3 is connected to a terminal S 3, and the base of the transistor TR 4 is connected to a terminal S 4, and the phase of the transistor TR 5 is connected to a terminal S 5, and further the base of the transistor TR 6 is connected to a terminal S 6.

Respective specific control signals for driving the stepping motors STM 1 and STM 2 are inputted to the terminals S 1–S 6 from the output portion of a microcomputer CPU. Namely, a stepping motor STM 1 selection signal for causing the stepping motor STM 1 to selectively drive is inputted to the terminal S 1, and a stepping motor STM 2 selection signal for causing the stepping moptor STM 2 to selectively drive is inputted to the terminal S 2. Further, the first phase excitation signal of the stepping motor is inputted to the terminal S 3, and the second phase excitation signal is inputted to the terminal S 4, and the third phase excitation signal is inputted to the terminal S 5, and the fourth phase excitation signal is inputted to the terminal S 3.

The microprocessor CPU comprises a read-only-memory ROM and a random access memory, and a stepping motor control program and the like is stored in the read-only-memory ROM, and conversely, the data and the like obtained, wherein the respective phase excitation signals mentioned above are outputted from the microcomputer CPU, are memorized in the random access memory RAM, and the mi microprocessor CPU recognizes the rotational angles of the stepping motor STM 1 and the stepping motor STM 2 on the basis of the data.

Further, a form selection switch CSF for selectively setting the form being printed to the cut forms and a starting switch TOF which is pressed when the forms are fed are connected to the microcomputer CPU.

According to the configuration of the electrical circuits as mentioned above, it is determines that the stepping motor STM 1 or the stepping motor STM 2 is driven by the stepping motor selection signal which is outputted from the microcomputer CPU, and further it is determined that any phase of the selected stepping motor is excited by the respective phase exciting signals. Further, the stepping motor selection signal and respective phase exciting signals which are outputted from the microcomputer CPU are voltage signals with a sufficient level to cause the transistors TR 1 –TR 6 to switch on, and respective phase exciting signals after the mode of pulse signal.

For example, in making a one-step rotation by exciting the first phase of the stepping motor STM 1, the microcomputer CPU outputs the stepping motor STM 1 selection signal to the terminal S 1 and outputs the first phase exciting signal of a pulse to the terminal S 3. As a result, the transistor TR 1 switches on and the transistor TR 3 switches on for only a period of time in response to the pulse width of a pulse signal to cause the excitation current to flow in the first phase coil C1 of the stepping motor STM 1, and to cause the motor STM 1 to rotate by the angle for one step.

The microcomputer CPU memorizes the first phase excitation signal outputted at this time as output data in the random access memory RAM, and in causing the exciting current to flow in the stepping motor STM 1 at the next time, it reads out the output data, and it outputs the next phase exciting signal, in addition to recognizing the rotation position of the stepping motor STM 1.

The above operation is similarly made with reference to other phases C2–C4 and with reference to the other motor STM 2.

Figure 5:
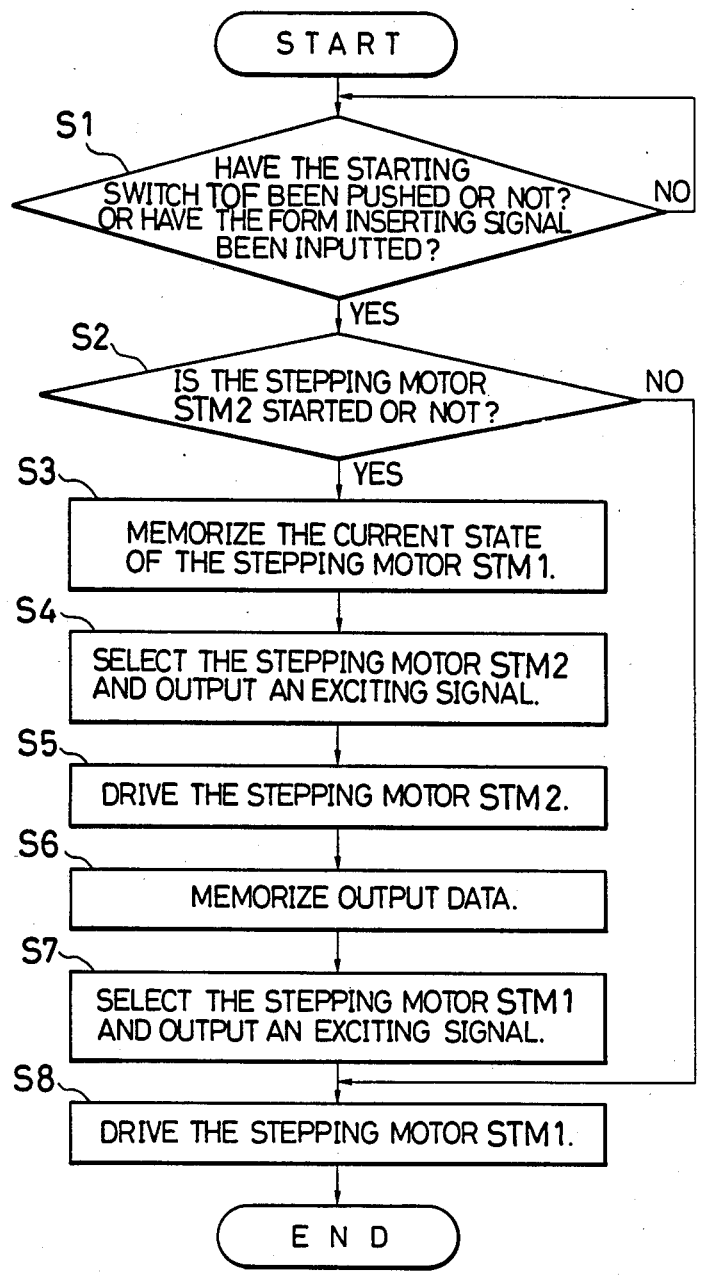
FIG. 5 is a flow chart of driving and controlling of the stepping motors.

Next, a series of operations of the motor drive of the present embodiment will be described in accordance with the flow chart shown in FIG. 5.

Although not shown, immediately after the power supply is shut off, the microcomputer CPU causes a current to successively flow in respective motors STM 1 and STM 2 for a short period of time, and it forcedly sets them to the excitation state of the specific phase, and it memorizes the data corresponding to the excitation state of the phase. And the microcomputer switches to the respective state when the CSF or TOF switches are pressed or when a form inserting signal is awaited from a host computer.

In the state when the cut forms have been set by the form selection switch CSF, when the starting switch TOF for feeding the forms to the initial printing position is pressed, or the form inserting signal from the host computer is inputted (the step S1), the microcomputer CPU, in the step S2, determines whether the stepping motor STM 2 for driving the automatic paper feeding mechanism 13 to feed the cut forms to the platen 3 is started or not. Namely, when the form still remains at the portion of the form feeding mechanism 40, including the platen 3, since it is necessary to eject the remaining form, the stepping motor STM 1 is continuously driven by directly stepping into the step S8, without driving the stepping motor STM 2 (NO in the step S 2), to carry out the processing of ejecting the remaining form. On the other hand, when there is not remaining form, the judgement that the stepping motor STM 2 is driven is made YES in the step S2).

In the step S3, after the current phase exciting state of the platen driving motor, namely, the state of stepping motor STM 1 has been memorized on the basis of the outputted data at the previous time, the microcomputer CPU, in step S 4, outputs the selection signal to the stepping motor STM 2 and reads out the data on the basis of the final excitation state at the previous time to output the phase excitation signal which corresponds to the data, and in step S5, the stepping motor STM 2 is rotated by one rotation.

In the next step S 6, after the microcomputer CPU has memorized the outputted data on the basis of the outputted signal of the final excitation state which is outputted to the stepping motor STM 2 at this time, in the next step S7, it outputs the stepping motor STM 1 selection signal in order to select the platen driving motor, namely, the stepping motor STM 1, and reads out the data of the final excitation state at the previous time which are memorized in the step S 3 to output the phase excitation signal to the given phase corresponding to the data, and in the step S8, the stepping motor STM 1 is rotated by the required angle, and the cut forms are fed to the printing position, and the line feed is carried out, accompanied by the printing operation by the printing head 4. When printing has been completed and the forms are ejected, the stepping motor STM 1 remains at the final excitation state, and thereafter, when the switches CSF and TOF are pressed again, returning to the step S 3, the microcomputer CPU memorizes the data of the final excitation state of the stepping motor STM 1, and the respective steps mentioned above are performed.

Further, in the present embodiment, the form feeding mechanism 40 and the automatic paper feeding mechanism 13, by way of examples, as driven sections which are driven respectively by two stepping motors STM 1 and STM 2, have been described, however, the motor driving device of the present invention can be applied to other mechanisms of the printer, if these mechanisms operate with different operating timings.

What is claimed is:

1. A motor driving device in a printer comprising a first stepping motor having a plurality of phase coils for driving a first driven section and a second stepping motor having a plurality of phase coils similar in number to the phase coils of said first stepping motor for driving a second driven section in which the motor driving device comprises driving circuit means including a first drive selection element connected to a common terminal of the phase coil of said stepping motor, said first drive selection element selecting and driving said first stepping motor in accordance with a first selection signal, a second drive selection element connected to a common terminal of the phase coils of said second stepping motor said second drive selection element selecting and driving said second stepping motor in accordance with the second selection signal, and a plurality of phase current flowing elements each of which is commonly connected to the respective ends of the same phase coil of said first and second stepping motors for carrying out switching operations for said first and second stepping motors in accordance with phase control signals.

control circuit means for outputting said first and second selection signals to said first and second drive selection elements respectively thereby selecting one of said first and second stepping motors, and for outputting said phase control signals to said phase current flowing elements respectively in a given timing sequence, thereby causing rotation of said selected stepping motor, memory means for memorizing data which correspond to said outputted phase control signals, thereby recognizing rotation position of said selected stepping motor, said data for the selected motor being adapted to be read from said memory means by said control circuit means when the phase control signals are outputted again subsequent times the same motor is selected.

2. A motor driving device in a printer comprising a first stepping motor having a plurality of phase coils for driving a first driven section and a second stepping motor having a plurality of phase coils similar in number to the phase coils of said first stepping motor for driving a second driven section, in which the motor driving device comprises driving circuit means including a first drive selection element connected to a common terminal of the phase coils of said first stepping motor said first drive selection element selecting and driving said first stepping motor in accordance with a first selection signal, a second drive selection element connected to a common terminal of the phase coils of said second stepping motor and for said second drive selection element selecting and driving said second stepping motor in accordance with a second selection signal, and a plurality of phase current flowing elements each of which is commonly connected to the respective ends of the same phase coils of said first and second stepping motors and for carrying out switching operations for said first and second stepping motors in accordance with phase control signals, control circuit means for outputting said first and second selection signals to said first and second drive selection elements, respectively, thereby selecting one of said first and second stepping motors, and for outputting said phase control signals to said phase current flowing elements respectively in a given timing sequence, thereby causing rotation of said stepping motor, wherein said first driven section is a form feeding mechanism to carry out line feeding of printing forms in a printing position, and said second driven section is an automatic paper feeding mechanism to carry out feeding of printing forms towards said form feeding mechanism and second automatic paper feeding mechanism includes a feeding cam roller contacting the printing forms, and the length of a feeding surface of said feeding cam roller contacting the printing forms in equal to or greater than the distance from said automatic paper feed mechanism to a paper feeding slit of said form feeding mechanism.

* * * * *